(12) United States Patent
Hamada

(10) Patent No.: US 8,300,255 B2
(45) Date of Patent: Oct. 30, 2012

(54) PRINTING APPARATUS, PRINTING SYSTEM, AND METHOD OF DELETING INVALID PRINTING DATA FROM STORAGE

(75) Inventor: Ryoh Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 409 days.

(21) Appl. No.: 12/723,783

(22) Filed: Mar. 15, 2010

(65) Prior Publication Data
US 2010/0253974 A1 Oct. 7, 2010

(30) Foreign Application Priority Data

Apr. 7, 2009 (JP) ................................. 2009-093062

(51) Int. Cl.
*G06F 15/00* (2006.01)
*G06F 15/16* (2006.01)
(52) U.S. Cl. .................. 358/1.15; 709/203; 709/206
(58) Field of Classification Search ............... 358/1.15; 709/203, 206
See application file for complete search history.

(56) References Cited

U.S. PATENT DOCUMENTS

| 2004/0136358 A1* | 7/2004 | Hind et al. ............... 370/352 |
| 2008/0016090 A1 | 1/2008 | Fukata |
| 2008/0201445 A1* | 8/2008 | Hayashi ................ 709/217 |

FOREIGN PATENT DOCUMENTS

| JP | 2004-192548 A | 7/2004 |
| JP | 2008-5092 A | 1/2008 |

* cited by examiner

*Primary Examiner* — Benny Q Tieu
*Assistant Examiner* — Qian Yang
(74) *Attorney, Agent, or Firm* — Birch, Stewart, Kolasch & Birch, LLP

(57) ABSTRACT

In a printing apparatus on a DHCP network, printing data accumulated in the printing apparatus is deleted without troubling a user and shortage of storage capacity is prevented. The printing apparatus is connected through a network to a DHCP server apparatus that stores IP address assignment information including an IP address of each DHCP client. The printing apparatus includes a printing data storage portion that accumulates printing data transmitted from each DHCP client along with the IP address of each DHCP client, and a CPU that determines whether or not each DHCP client is invalid based on IP address lease information stored in the DHCP server and deletes the printing data of the DHCP client which is determined to be invalid from the printing data storage portion.

12 Claims, 7 Drawing Sheets

```
          21
           )
    lease 192.168.0.101 {
22 ——starts 4 2001/08/05 08:19:22;
23 ——ends 4 2001/08/05 08:29:22;
24 ——hardware ethernet 00:60:97:77:E9:1F;
       }
```

FIG. 4

← %-12345X@PJL JOB NAME="Microsoft Word - SAMPLE.doc"
@PJL SET PCNAME="xxx-xxxxx" ～ 31
@PJL SET PCNAMEW="xxx-xxxxx"
@PJL SET DRIVERNAME="SHARP MX-4101FN SPDL2-c "
@PJL SET JOBNAME="Microsoft Word - SAMPLE.doc"
@PJL SET JOBNAMEW="Microsoft Word - SAMPLE.doc"
@PJL SET SPOOLTIME="Mon, 17 Nov 2008 16:13:00 +0900"
@PJL SET FILING=OFF
@PJL SET USERNAME="yyyyy"
@PJL SET USERNAMEW="yyyyy"
@PJL SET NOTIFYJOBEND=ON
@PJL SET IPADDRESS="192.168.0.101" ～ 32
@PJL SET HOLD=OFF
@PJL SET QTY=1
@PJL SET OUTBIN=UPPER
@PJL SET DUPLEX=OFF
@PJL SET JOBBOOKLET=OFF
@PJL SET BINDING=LONGEDGE
@PJL SET JOBOFFSET=ON
@PJL SET ORIENTATION=PORTRAIT
@PJL SET REVERSEIMAGE=OFF
@PJL SET MARGINSHIFT=0
@PJL SET MEDIATYPE=DEFAULTMEDIATYPE
@PJL SET INTERLEAVE=OFF
@PJL SET JOBSTAPLE=STAPLENO
@PJL SET PUNCH=OFF
@PJL SET RESOLUTION=600
@PJL SET PAGEIMAGEINFO=ONEUP
@PJL SET PAGESTAMPINFO=NONE
@PJL SET PAGEOVERLAYINFO=OFF
. . . . .

PRINTING APPARATUS, PRINTING SYSTEM, AND METHOD OF DELETING INVALID PRINTING DATA FROM STORAGE

CROSS-NOTING PARAGRAPH

This Non-provisional application claims priority under 35 U.S.C. §119 (a) on Patent Application No. 2009-093062 filed in JAPAN on Apr. 7, 2009, the entire contents of which are hereby incorporated herein by reference.

FIELD OF THE INVENTION

The present invention relates to a printing apparatus, a printing system and a method of deleting printing data, and more particularly to a printing apparatus, a printing system and a method of deleting printing data for controlling deletion of printing data accumulated in a printing apparatus on a DHCP network.

BACKGROUND OF THE INVENTION

Printing apparatuses such as printers and MFPs (digital Multi-Functional Peripherals) of recent years include an HDD (Hard Disk Drive), a large-capacity memory and the like, and these are capable of saving printing data temporarily. Since a printing apparatus is usually shared by a plurality of users most of the time, passwords are set or encryption is applied for printing data.

On the other hand, a place of using the printing apparatus is not limited to a usual office, but there is a case where it is opened to an unspecified large number of users. As an example, there are facilities such as business hotels or Net cafes. At these facilities, generally a network by a DHCP (Dynamic Host Configuration Protocol) is used. The DHCP is a protocol that is for automatically assigning information associated with TCP (Transmission Control Protocol)/IP (Internet Protocol) such as an IP address or a subnet mask for a client apparatus.

The structure of a DHCP is realized by a DHCP server that manages IP addresses uniformly, and a DHCP client to which an IP address is assigned by the DHCP server. At the DHCP server, a plurality of IP addresses are registered for the DHCP clients. On the other hand, the DHCP client is able to communicate by receiving an IP address that registered in the DHCP server at the time of startup. As described above, it is possible to save a user or a system administrator from a lot of trouble on the network by managing the information associated with TCP/IP uniformly by the DHCP server.

In the facilities such as hotels and Net cafes where the above-described DHCP network is established, the password setting or the encryption becomes further important functions since an unspecified large number of users use a printing apparatus in turns. Moreover, a so-called confidential printing that printing data is once accumulated in a printing apparatus and taken out as a printed matter by inputting a password is likely to be used as a method of using the printing apparatus from a view point of security of output results.

Here, when the unspecified large number of users use the printing apparatus one after another, the printing data once accumulated in the printing apparatus is not necessarily output immediately. For example, in a case where a user forgot to perform an output instruction of the printing data and left as it is after a printing instruction and left the facility, the printing data that is not output is left without being deleted, thus resulting in a problem of shortage of free space of a storage apparatus in the printing apparatus before long.

For such a problem, for example, Japanese Laid-Open Patent Publication No. 2008-5092 describes an image forming apparatus that is capable of deleting printing data which has elapsed a certain period of time from an external storage apparatus. The image forming apparatus includes a function of automatically deleting the file corresponding to an elapse of saving period of a file stored in the external storage apparatus.

However, in the image forming apparatus described in the above Japanese Laid-Open Patent Publication No. 2008-5092, a problem such as following occurs. That is, since the staying time of a user varies at a hotel, Net cafe and the like, it is difficult to set a certain saving period for the image forming apparatus. Moreover, although a method of prompting a user to set a saving period may be considered, in this case, the user is forced to be burdened with a setting operation, thus some users may not perform the setting. Therefore, it is difficult to set a saving period of a file for each user.

SUMMARY OF THE INVENTION

An object of the present invention is to delete printing data accumulated in the printing apparatus without placing a burden on a user and to prevent shortage of the storage capacity in a printing apparatus on a DHCP network.

An object of the present invention is to provide a printing apparatus connected through a network to a DHCP server apparatus that stores IP address assignment information including an IP address of each client apparatus, comprising: a storage portion that accumulates printing data transmitted from each client apparatus along with the IP address of each client apparatus; and a control portion that determines whether or not each client apparatus is invalid based on the IP address assignment information stored in the DHCP server apparatus, and deletes the printing data of the client apparatus which is determined to be invalid from the storage portion.

Another object of the present invention is to provide the printing apparatus, wherein when an electronic mail address is added to the printing data transmitted from each client apparatus, the storage portion accumulates the printing data transmitted from each client apparatus along with the IP address and the electronic mail address of each client apparatus, and the control portion transmits a warning message for notifying that the printing data of the client apparatus determined to be invalid by the control portion is to be deleted from the storage portion to the electronic mail address of the client apparatus.

Another object of the present invention is to provide the printing apparatus, wherein the printing data is deleted from the storage portion after a lapse of a predetermined period since transmission of the warning message.

Another object of the present invention is to provide the printing apparatus, wherein when an electronic mail address is added to the printing data transmitted from each client apparatus, the storage portion accumulates the printing data transmitted from each client apparatus along with the IP address and the electronic mail address of each client apparatus, and the control portion deletes the printing data from the storage portion by transmitting an electronic mail to which the printing data is attached to the electronic mail address of the client apparatus which is determined to be invalid by the control portion.

Another object of the present invention is to provide the printing apparatus, wherein when attaching the printing data to the electronic mail, the control portion performs attaching after converting a data format of the printing data into a PDF format or a TIFF format.

Another object of the present invention is to provide the printing apparatus, wherein the control portion determines whether or not each client apparatus is invalid according to the IP address and its validity-term information included in the IP address assignment information.

Another object of the present invention is to provide the printing apparatus, wherein the control portion determines whether or not each client apparatus is invalid according to the IP address, the validity-term information of the IP address, and a MAC address of the client apparatus included in the IP address assignment information.

Another object of the present invention is to provide the printing apparatus, wherein when remaining capacity of the storage portion becomes a certain level or less, the printing apparatus accesses the DHCP server apparatus and obtains the IP address assignment information stored in the DHCP server apparatus.

Another object of the present invention is to provide the printing apparatus, wherein the printing apparatus accesses the DHCP server apparatus at a predetermined timing and obtains the IP address assignment information stored in the DHCP server apparatus.

Another object of the present invention is to provide the printing apparatus, wherein the printing apparatus is connected through a network to a printing management apparatus for managing the printing apparatus, when the printing data of the client apparatus which is determined to be invalid is accumulated in the storage portion, the control portion notifies the printing management apparatus of the fact and deletes the printing data from the storage portion according to an instruction from the printing management apparatus.

Another object of the present invention is to provide a printing system in which a plurality of client apparatuses, a DHCP server apparatus that stores the IP address assignment information including an IP address of each client apparatus and a printing apparatus are connected through a network, wherein the printing apparatus comprising: a storage portion that accumulates printing data transmitted from each client apparatus along with the IP address of each client apparatus; and a control portion that determines whether or not each client apparatus is invalid based on the IP address assignment information stored in the DHCP server apparatus, and deletes the printing data of the client apparatus which is determined to be invalid from the storage portion.

Another object of the present invention is to provide a method of deleting printing data by a printing apparatus connected through a network to a DHCP server apparatus that stores the IP address assignment information including an IP address of each client, wherein the printing apparatus comprising: a step of accumulating printing data transmitted from each client apparatus along with the IP address of each client apparatus; a step of obtaining the IP address assignment information stored in the DHCP server apparatus when remaining capacity of the storage portion becomes a certain level or less; and a step of determining whether or not each client apparatus is invalid based on the obtained IP address assignment information, and deleting the printing data of the client apparatus which is determined to be invalid from the storage portion.

BRIEF DESCRIPTION OF THE DRAWINGS

FIG. 4 is a diagram showing an example of printing data transmitted to the printing apparatus from a DHCP client;

PREFERRED EMBODIMENTS OF THE INVENTION

Hereinafter, description will be given to a preferred embodiment with respect to a printing apparatus, a printing system and a method of deleting printing data of the present invention with reference to the attached drawings.

Figure 1:
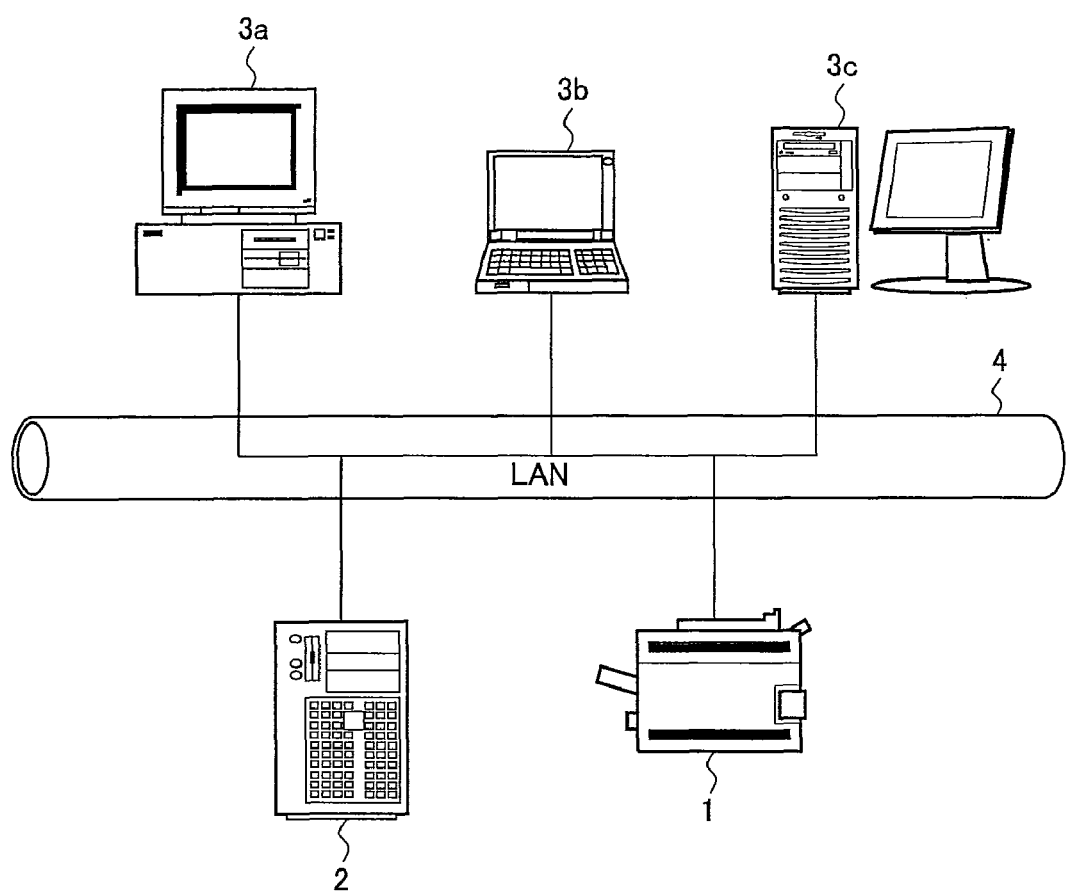
FIG. 1 is a diagram showing an example of a printing system using a DHCP network.

FIG. 1 is a diagram showing an example of a printing system using a DHCP network, and in the diagram, 1 denotes a printing apparatus, 2 denotes a DHCP server, 3a to 3c denote DHCP clients, and 4 denotes a LAN (Local Area Network). The printing apparatus 1 may be a multi-functional peripheral (MFP) including a printer function, a copy function, a facsimile function, a scanner function and the like, or may be a single-functional peripheral including only the printer function. The LAN 4 is a network using a DHCP and the printing apparatus 1, the DHCP server 2, and the DHCP clients 3a to 3c are respectively connected to the LAN 4.

Description will hereinafter be given to a general configuration example of the DHCP server 2.

The DHCP server 2 is an ordinary general-purpose computer and provided with, for example, a control apparatus including a CPU, a RAM, a ROM and the like, a storage apparatus such as an HDD, an input apparatus such as a keyboard, a mouse (pointing device), a display apparatus such as a CRT (Cathode Ray Tube), an LCD (Liquid Crystal Display) or the like, a communicating apparatus which is a network interface for connecting to the LAN 4, an output apparatus for outputting data by connecting to an external device, and a system bus for connecting the control apparatus, the storage apparatus, the input apparatus, the display apparatus, a communicating apparatus, and the output apparatus with each other. Note that, since the DHCP clients 3a to 3c are basically the general-purpose computers similar to the DHCP server 2, description thereof are omitted here.

In FIG. 1, the DHCP server 2 is connected to the LAN 4, and the DHCP server 2 assigns an IP address to each of the DHCP clients 3a to 3c dynamically. On the one hand, concerning an IP address of the printing apparatus 1, a fixed IP address is after assigned manually in general. This is because when the IP address of the printer which is a destination of data in printing is changed dynamically, the destination should be changed accordingly. The DHCP server 2 stores IP address assignment information including the IP addresses of the DHCP clients 3a to 3c. In such a DHCP network, the printing apparatus 1 is capable of knowing whether or not the DHCP clients 3a to 3c principally involving a PC (Personal Computer) are in an invalid state from the IP address assignment information stored in the DHCP server 2. Description for this will be given below.

Note that, there is a method for directly confirming the validity/invalidity of the DHCP client by a Ping command or the like from a printing apparatus side. However, when this method is applied, it is not preferable because it is required to confirm that all the IP addresses in a segment are validity or invalidity, and furthermore, there is a great possibility that such processing may be recognized to be an operation of a harmful program (worm) on the network.

Figures 2, 3:
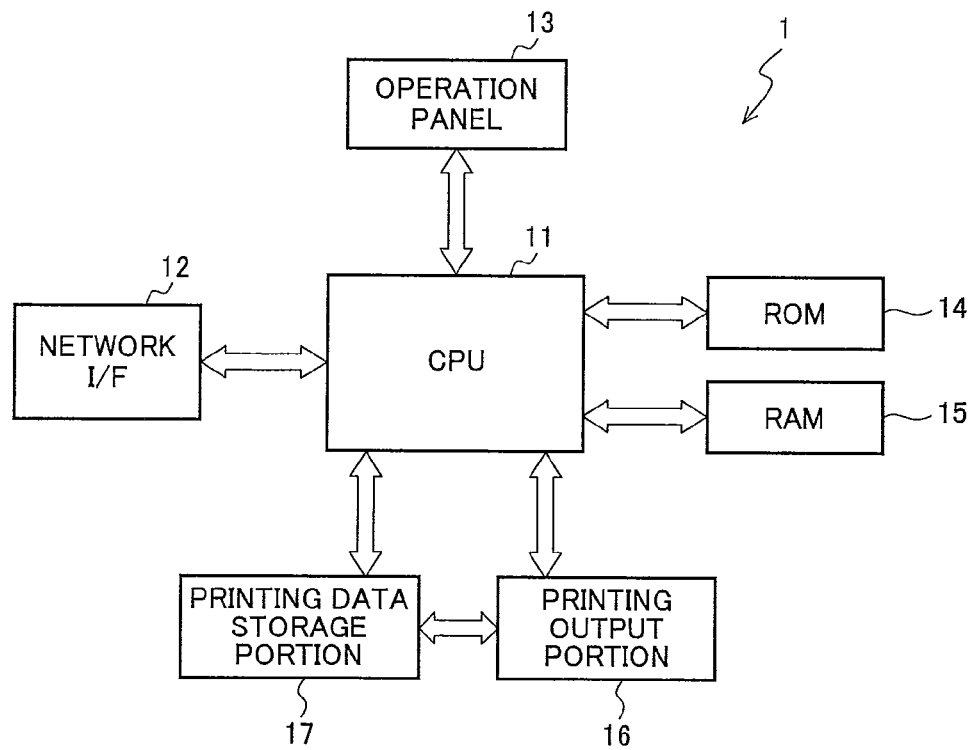
FIG. 2 is a block diagram showing a configuration example of a printing apparatus according to the present invention.
FIG. 3 is a diagram showing an example of IP address assignment information stored in a DHCP server.

FIG. 2 is a block diagram showing a configuration example of a printing apparatus 1 according to the present invention. In the diagram, the printing apparatus 1 includes a CPU 11 that corresponds to a control portion for controlling the printing apparatus 1, a network interface (network I/F) 12 for connecting to the LAN 4, an operation panel 13 for a user to operate the printing apparatus 1, a ROM 14 that is a nonvolatile memory for storing a control program or data to control the printing apparatus 1, a RAM 15 that is a volatile memory to be used as an execution region for executing the control program, a printing output portion 16 including a paper transporting portion, a laser portion, a developing portion, a fixing portion and the like, and a printing data storage portion 17 that corresponds to a storage portion such as an HDD or the like for storing printing data. In operating the printing apparatus 1, the CPU 11 reads the control program stored in the ROM 14 out to the RAM 15, and realizes various functions by executing the control program in the RAM 15.

FIG. 3 is a diagram showing an example of IP address assignment information stored in the DHCP server 2. Hereinafter, the IP address assignment information is referred to as IP address lease information. Every time the DHCP server 2 leases (assigns) IP addresses to DHCP clients 3a to 3c, the IP address lease information is renewed and stored. The IP address lease information is roughly composed of lease 21, starts 22, ends 23 and hardware 24.

The lease 21 shows an IP address (192.168.0.101 in this example) leased to the DHCP client. In addition, the starts 22 indicates the time when the lease of the IP address is started, the ends 23 indicates the time when the lease of the IP address is finished or is to be finished. The period specified by the starts 22 and the ends 23 corresponds to the term of validity information and indicates the period during which the DHCP client corresponding to the IP address is determined to be valid on the DHCP network. Furthermore, the hardware 24 indicates the information concerning the hardware of the DHCP client to which the IP address is leased. In this example, "ethernet" which indicates that the lease is for the Ethernet (registered trademark) device, and "00:60:97:77:E9:1F" as a MAC (Media Access Control) address which is an ID unique to a network card built in the DHCP client, are recorded.

FIG. 4 is a diagram showing an example of printing data transmitted to the printing apparatus 1 from the DHCP clients 3a to 3c. This printing data includes a computer name 31 of a transmitting source and an IP address (192.168.0.101 in this example) 32. Thereby, the printing apparatus 1 is capable of determining that by which DHCP client the printing data is transmitted. Moreover, the MAC address of the DHCP client of the transmitting source may be included in the printing data of FIG. 4 so as to use the MAC address for determining whether or not the DHCP client is invalid.

The main characteristic part of the present invention is to prevent shortage of storage capacity in the printing apparatus on the DHCP network by deleting the printing data accumulated in the printing apparatus without troubling a user. As a configuration for this, the printing apparatus 1 includes the printing data storage portion 17 which accumulates the printing data that is transmitted from the DHCP clients 3a to 3c along with the IP addresses of the DHCP clients 3a to 3c, and the CPU 11 which determines whether or not the DHCP clients 3a to 3c are invalid based on the IP address lease information stored in the DHCP server 2 and deletes the printing data of the DHCP client determined to be invalid from the printing data storage portion 17.

Note that, the printing data include the name of the computer of the transmitting source, the IP address and the like as shown in FIG. 4, the IP address lease information includes the IP address leased to the DHCP client, the term of validity information of the IP address, the MAC address of the DHCP client (network card) and the like as shown in FIG. 3.

In FIG. 2, the CPU 11 of the printing apparatus 1 determines whether or not the DHCP clients 3a to 3c are invalid based on the IP address lease information obtained from the DHCP server 2. For example, since the IP address lease information includes the term of validity information of the IP address, a DHCP client whose term of validity has elapsed can be determined to be an invalid client on the DHCP network. Then, the CPU 11 retrieves the printing data including the IP address of the DHCP client determined to be invalid from among the printing data accumulated in the printing data storage portion 17 and deletes the retrieved data.

Specifically, in FIG. 1, if a time and date when the printing apparatus 1 accessed the DHCP server 2 is Feb. 20, 2009, and the expire date of the term of validity of the IP address of the DHCP client 3a is Feb. 18, 2009, the term of validity of the IP address of the DHCP client 3a expired when the apparatus 1 accessed the DHCP server 2, therefore the printing data of the DHCP client 3a is deleted from the printing data storage portion 17. If the time and date when the printing apparatus 1 accessed the DHCP server 2 is immediately after a lapse of the term of validity incidentally, deletion of the printing data is not desirable considering the convenience of the user. Then, for example, only the printing data of the IP address whose term of validity has expired one day or more before may be a target of deletion.

Additionally, other determination method may be considered. For example, since the IP address lease information includes the MAC address, it is possible to determine whether or not the DHCP client is invalid by using the MAC address. In the case of the above IP address, since it is leased to a DHCP client dynamically, there is a case where the same IP address is leased when the DHCP client is replaced. However, since the MAC address is the ID unique to the network card built in the DHCP client, when the DHCP client is replaced, the MAC address is naturally changed.

That is, even when the term of validity of the IP address has not expired, in a case where the MAC address has been changed, it is considered that the DHCP client has been replaced. In such a case, the printing data transmitted from the DHCP client (corresponding to the MAC address before changing) prior to the replacement may be regarded as the unnecessary one.

In the above, the CPU 11 of the printing apparatus 1 determines that the DHCP client corresponding to the MAC address before the change is invalid when the MAC address is changed based on the IP address, the term of validity information thereof and the MAC address considering that the DHCP client had been replaced even when the term of validity of the IP address has not expired. The CPU 11 judges that the printing data of the DHCP client determined to be invalid is unnecessary among the printing data accumulated in the printing data storage portion 17, and deletes the data determined to be invalid. In this example, if the MAC address is included in the printing data, it is possible to retrieve the printing data including the MAC address before the change from among the printing data accumulated in the printing data storage portion 17 and to delete the retrieved printing data.

Here, description will be given for timing when the printing apparatus 1 obtains the IP address lease information from the DHCP server 2. For example, the printing apparatus 1 is able to access the DHCP server 2 and obtains the IP address lease information stored in the DHCP server 2 when it detects the remaining capacity of the printing data storage portion 17 is a certain level or less. In this case, when a standard value of judgement for the remaining capacity is set, for example, to be about 50% of the total storage capacity, deletion of the printing data can be performed in a state where the remaining capacity is sufficient. Therefore, it is preferable since it is possible to operate the printing system in a state where the remaining capacity is sufficient all the time.

Furthermore, when the unnecessary printing data is desired to be deleted periodically, the printing apparatus 1 may access the DHCP server 2 at a predetermined timing and obtain the IP address lease information stored in the DHCP server 2. For example, when setting is performed so as to access at a predetermined time (for example, at night), the printing apparatus 1 is able to obtain the IP address lease information from the DHCP server 2 at night when the printing apparatus 1 is usually not used, and is able to perform deletion of the unnecessary printing data based on the IP address lease information.

Note that, in the above, although the printing apparatus 1 obtains all pieces of the IP address lease information from the DHCP server 2, the printing apparatus 1 may inquire the DHCP server 2 about the IP addresses whose term of validity has expired, and for this inquiry, the DHCP server 2 may give the notification of the IP address whose term of validity has expired. In this case, since the DHCP server 2 notifies the printing apparatus 1 of the IP address whose term of validity has expired selectively, the printing apparatus 1 does not need to determine whether or not the term of validity has expired for the IP address of each DHCP client based on the IP address lease information.

Figure 5:
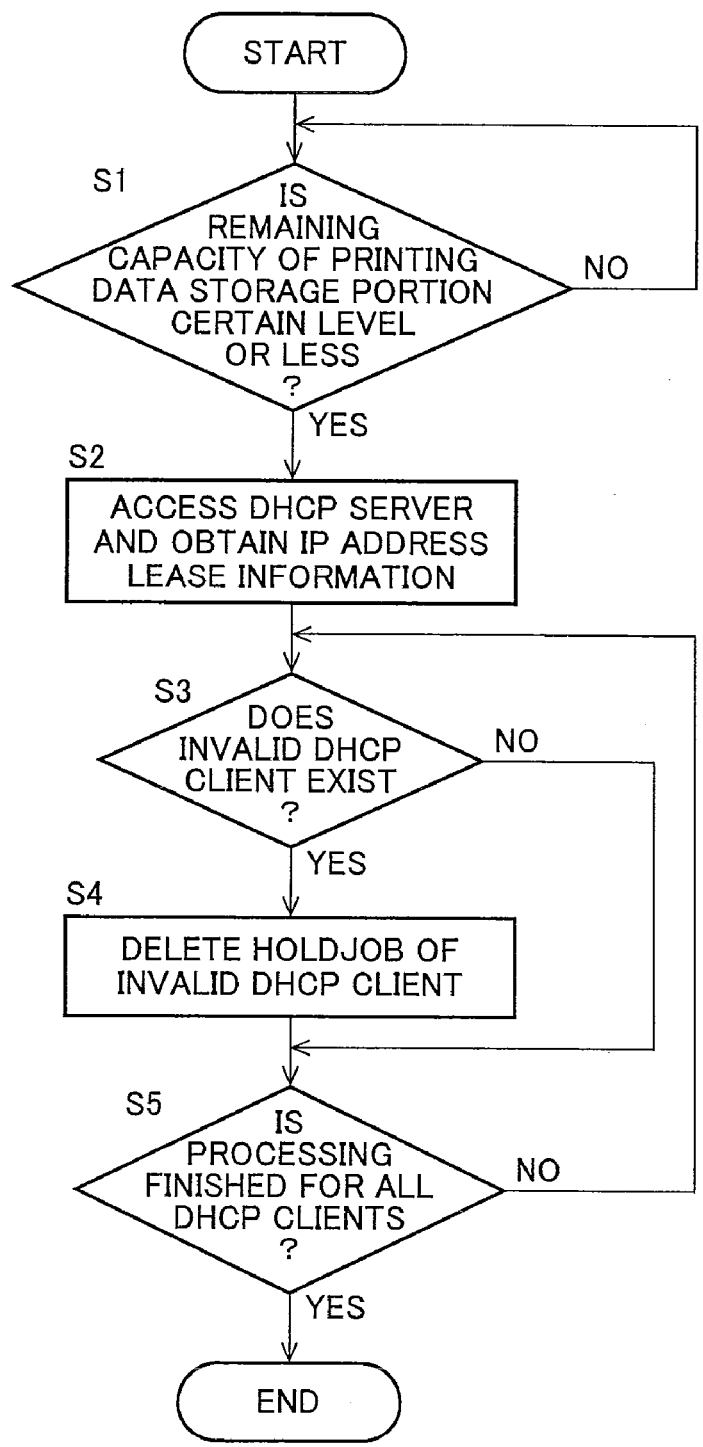
FIG. 5 is a flow diagram explaining an example of a method of deleting printing data to which the present invention is applied.

FIG. 5 is a flow diagram explaining an example of a method of deleting printing data to which the present invention is applied. In this example, although description will be given based on the above-described system configuration of FIG. 1, the printing apparatus 1 is assumed to accumulate the printing data transmitted from the DHCP clients 3a to 3c along with the IP addresses of the DHCP clients 3a to 3c in the printing data storage portion 17.

First, the printing apparatus 1 determines whether or not the remaining capacity of the printing data storage portion 17 is a certain level or less (step S1), when the remaining capacity is determined to be not a certain level or less (in the case of NO), the determination processing of the remaining capacity is repeated at step S1. Furthermore, at step S1, when the remaining capacity is determined to be a certain level or less (in the case of YES), the printing apparatus 1 accesses the DHCP server 2 and obtains the IP address lease information from the DHCP server 2 (step S2).

Next, the printing apparatus 1 determines if there is one which is invalid among the DHCP clients 3a to 3c based on the IP address lease information obtained from the DHCP server 2 (step S3), and when it is determined there is an invalid DHCP client (in the case of YES), a holdjob (printing data) of the invalid DHCP client is retrieved using IP address, and the retrieved holdjob is deleted (step S4). Then, whether or not the invalidity determination processing is finished for all the DHCP clients is determined (step S5), and when the invalidity determination processing is finished (in the case of YES), it is finished without doing anything, and when the invalidity determination processing is not finished (in the case of NO), the flow returns to step S3 and the process is repeated.

Additionally, at step S3, when it is determined that there is no invalid DHCP client (in the case of NO), the flow shifts to step S5. Then, as same as the above, it is determined whether or not the invalidity determination processing is finished for all the DHCP clients, and when the invalidity determination processing is finished (in the case of YES), it is finished without doing anything, and when the invalidity determination processing is not finished (in the case of NO), the flow returns to step S3 and the process is repeated.

Note that, the determination processing of the invalid DHCP client at step S3 can be performed by the above-described two methods. As a first method, the CPU 11 of the printing apparatus 1 determines that the DHCP client whose term of validity of the IP address has expired is the invalid client on the DHCP network. For example, among the DHCP clients 3a to 3c, when the lease term of an IP address leased to the DHCP client is expired, the DHCP client 3a who has the IP address is determined to be invalid.

As a second method, the CPU 11 of the printing apparatus 1 determines that the DHCP client corresponding to the MAC address before the changing is invalid, determining that the DHCP client had been replaced when the MAC address is changed, even though the term of validity of the IP address has not expired, based on the IP address, the term of validity thereof and the MAC address. For example, among the DHCP clients 3a to 3c, it is assumed that the DHCP client 3a is replaced with the DHCP client 3a', and the same IP addresses are leased to the DHCP client 3a and the DHCP client 3a'. In this case, the printing apparatus 1 is able to recognize that the DHCP client has been replaced since the MAC address has been changed before and after the switching. Thereby, the DHCP client 3a who has the MAC address before the replacement can be determined to be invalid.

Description will be given more specifically for the above-description, the printing apparatus 1, when receiving the printing data, obtains the IP address and the MAC address of the DHCP client of the transmitting source from the printing data and saves these along with the printing data (holdjob). The printing apparatus 1 then obtains the IP address lease information including the currently issued IP address and MAC address from the DHCP server 2. Then, the printing apparatus 1 compares a set of the IP address and the MAC address saved together with the printing data by the holdjob with a set of the IP address and the MAC address included in the IP address lease information, and when the IP addresses are the same and the MAC addresses are different, it is determined that the DHCP client has been replaced. The printing apparatus 1 then determines that this DHCP client is invalid and deletes the holdjob (printing data).

Furthermore, description will be given for another example of the method of deleting printing data according to the present invention based on FIG. 6 and FIG. 7. The DHCP clients 3a to 3c in this example obtain an electronic mail address of each client when installing a printer driver or the like, and the printer driver transmits the printing data along with the electronic mail address added thereto to the printing apparatus 1. The printing apparatus 1 accumulates the printing data transmitted from the DHCP clients 3a to 3c in the printing data storage portion 17 along with the IP address and the electronic mail address of each DHCP client.

Figure 6:
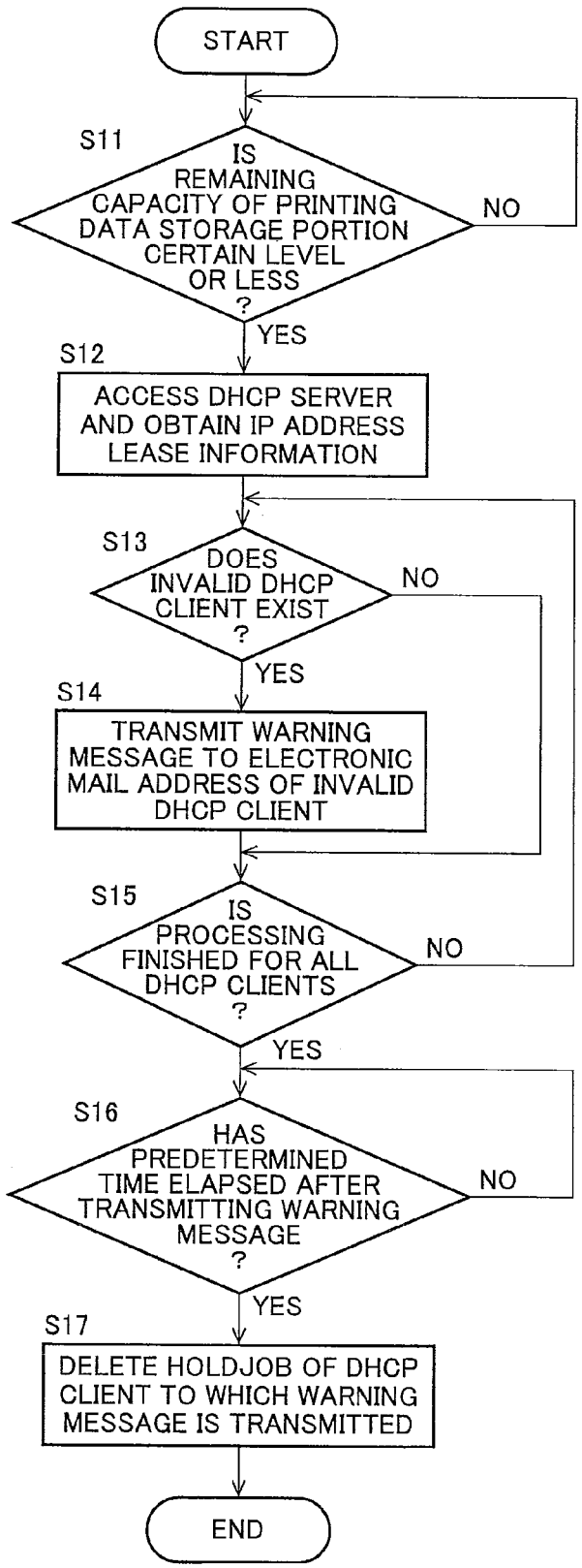
FIG. 6 is a flow diagram explaining another example of the method of deleting printing data to which the present invention is applied.

FIG. 6 is a flow diagram explaining another example of the method of deleting printing data to which the present invention is applied. Since steps S11 to S13 in this example are the same as steps S1 to S3 in the above-described FIG. 5, description thereof are omitted here. At step S14, the printing apparatus 1 transmits a warning message to indicate that the holdjob (printing data) is deleted from the printing data storage portion 17 to the electronic mail address of the invalid DHCP client, in the case of YES at step S13, when there is a DHCP client who is determined to be invalid due to the expiration of the term of validity of the IP address, for example.

Next, the printing apparatus 1 determines whether or not the invalidity determination processing is finished for all the DHCP clients (step S15), and when the invalidity determination processing is finished (in the case of YES), the flow shifts to step S16, and when the invalidity determination processing is not finished (in the case of NO), the flow returns to step S13 and the process is repeated. The printing apparatus 1 then determines, at step S16, whether or not the predetermined period has elapsed after transmitting the warning message, and when the predetermined period has elapsed after transmitting the warning message (in the case of YES), the holdjob of the DHCP client to which the warning message is transmitted is deleted from the printing data storage portion 17 (step S17). Furthermore, at step S16, when the predetermined period has not elapsed after transmitting the warning message (in the case of NO), the holdjob is not deleted and the flow shifts to a standby state at step S16.

In this manner, when it is determined that the term of validity of the IP address is expired, the warning message of deleting the printing data is transmitted, and after a lapse of the predetermined period from the time point when the warning message was transmitted, the printing data is deleted, thus the user is able to ensure the time to print the printing data for a while after receiving the warning, and therefore, it is possible to improve the convenience of the user.

Figure 7:
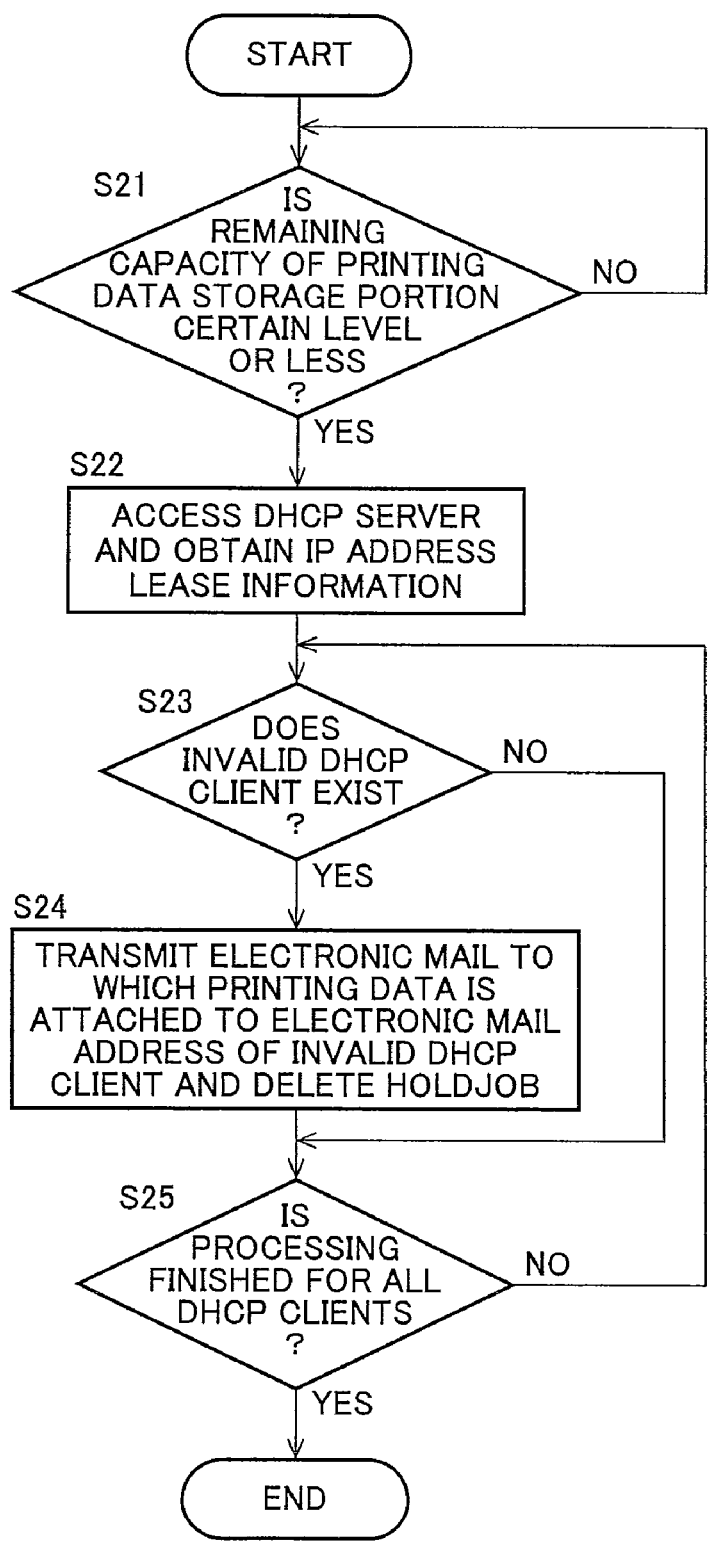
FIG. 7 is a flow diagram explaining another example of the method of deleting printing data to which the present invention is applied.

FIG. 7 is a flow diagram explaining another example of the method of deleting printing data to which the present invention is applied. Since steps S21 to S23 in this example are the same as the above-described steps S1 to S3 in FIG. 5, description thereof are omitted here. At step S24, the printing apparatus 1 transmits an electronic mail to which the holdjob (printing data) is attached to the electronic mail address of the invalid DHCP client, and deletes the holdjob from the printing data storage portion 17, in the case of YES at step S23, when there is a DHCP client who is determined to be invalid due to the expiration of the term of validity of the IP address, for example.

Next, the printing apparatus 1 determines whether or not the invalidity determination processing is finished for all the DHCP clients (step S25), and when the invalidity determination processing is finished (in the case of YES), it is finished without doing anything, and when the invalidity determination processing is not finished (in the case of NO), the flow returns to step S23 and the process is repeated.

Note that, at the above-described step S24, when the printing apparatus 1 attaches the holdjob to the electronic mail, attaching may be performed after converting the data format of the holdjob into the PDF format or the TIFF format.

Figure 8:
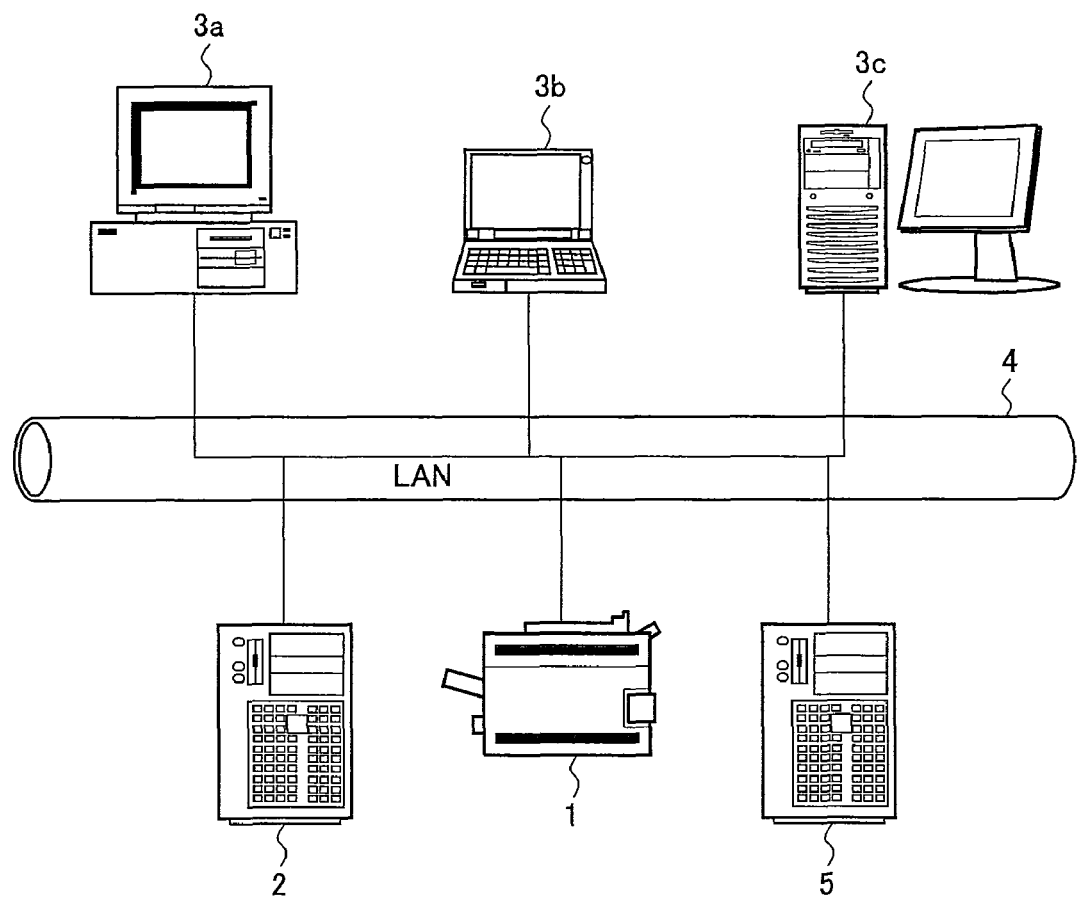
FIG. 8 is a diagram showing another example of a printing system using the DHCP network.

FIG. 8 is a diagram showing another example of a printing system established by using a DHCP network, and in the diagram, numeral 5 denotes a printing management server that corresponds to a printing management apparatus. Since other elements in the printing system are the same as those in FIG. 1, descriptions thereof are omitted here.

In this example, the printing management server 5 is connected to the LAN 4. When there remains printing data of the DHCP client determined to be invalid based on the IP address lease information in the printing data storage portion 17, the printing apparatus 1 notifies the printing management server 5 accordingly. Then, the printing apparatus 1 is configured to delete the printing data from the printing data storage portion 17 according to an instruction from the printing management server 5. The printing management server 5 displays information given from the printing apparatus 1 on a not-shown display portion, and is able to instruct the printing apparatus 1 to delete the printing data by means of an instruction of the system administrator. Alternatively, it is possible to instruct the printing apparatus 1 to delete the printing data after a lapse of a predetermined time from the receipt of notification from the printing apparatus 1. Thereby, a careless deletion of the printing data can be prevented.

For example, in a case where a DHCP client of an employee is connected and important printing data to be used for operations is to be accumulated in the printing apparatus 1, when deletion is performed so immediately like the printing data of the user, it may cause a problem. In such a case, giving a deletion instruction after confirming the printing data once at the printing management server 5 makes it possible to prevent the problem described above, since the deletion of the printing data can be performed according to the degree of importance of the printing data.

According to the present invention, in a printing apparatus on a DHCP network, it is possible to delete printing data accumulated in the printing apparatus without troubling a user and to prevent shortage of the storage capacity.

The invention claimed is:

1. A printing apparatus connected through a network to a DHCP server apparatus that stores IP address assignment information including an IP address of each client apparatus, comprising:
    a storage portion that accumulates printing data transmitted from each client apparatus along with the IP address of each client apparatus; and
    a control portion that determines whether or not each client apparatus is invalid based on the IP address assignment information stored in the DHCP server apparatus, and deletes the printing data of the client apparatus which is determined to be invalid from the storage portion.

2. The printing apparatus as defined in claim 1, wherein when an electronic mail address is added to the printing data transmitted from each client apparatus, the storage portion accumulates the printing data transmitted from each client apparatus along with the IP address and the electronic mail address of each client apparatus, and the control portion transmits a warning message for notifying that the printing data of the client apparatus determined to be invalid by the control portion is to be deleted from the storage portion to the electronic mail address of the client apparatus.

3. The printing apparatus as defined in claim 2, wherein the printing data is deleted from the storage portion after a lapse of a predetermined period since transmission of the warning message.

4. The printing apparatus as defined in claim 1, wherein when an electronic mail address is added to the printing data transmitted from each client apparatus, the storage portion accumulates the printing data transmitted from each client apparatus along with the IP address and the electronic mail address of each client apparatus, and the control portion deletes the printing data from the storage portion by transmitting an electronic mail to which the printing data is attached to the electronic mail address of the client apparatus which is determined to be invalid by the control portion.

5. The printing apparatus as defined in claim 4, wherein when attaching the printing data to the electronic mail, the control portion performs attaching after converting a data format of the printing data into a PDF format or a TIFF format.

6. The printing apparatus as defined in any one of claims 1 to 5, wherein the control portion determines whether or not each client apparatus is invalid according to the IP address and validity-term information included in the IP address assignment information.

7. The printing apparatus as defined in any one of claims 1 to 5, wherein the control portion determines whether or not each client apparatus is invalid according to the IP address, the validity-term information of the IP address, and a MAC address of the client apparatus included in the IP address assignment information.

8. The printing apparatus as defined in any one of claims 1 to 5, wherein when remaining capacity of the storage portion becomes a certain level or less, the printing apparatus accesses the DHCP server apparatus and obtains the IP address assignment information stored in the DHCP server apparatus.

9. The printing apparatus as defined in any one of claims 1 to 5, wherein the printing apparatus accesses the DHCP server apparatus at a predetermined timing and obtains the IP address assignment information stored in the DHCP server apparatus.

10. The printing apparatus as defined in claim 1, wherein the printing apparatus is connected through a network to a printing management apparatus for managing the printing apparatus, when the printing data of the client apparatus which is determined to be invalid is accumulated in the storage portion, the control portion notifies the printing management apparatus of the determined invalidity and deletes the printing data from the storage portion according to an instruction from the printing management apparatus.

11. A printing system in which a plurality of client apparatuses, a DHCP server apparatus that stores IP address assignment information including an IP address of each client apparatus, and a printing apparatus are connected through a network, the printing apparatus comprising:

a storage portion that accumulates printing data transmitted from each client apparatus along with the IP address of each client apparatus; and a control portion that determines whether or not each client apparatus is invalid based on the IP address assignment information stored in the DHCP server apparatus, and deletes the printing data of the client apparatus which is determined to be invalid from the storage portion.

12. A method of deleting printing data by a printing apparatus connected through a network to a DHCP server apparatus that stores the IP address assignment information including an IP address of each client, the printing apparatus comprising:

a step of accumulating printing data transmitted from each client apparatus along with the IP address of each client apparatus;

a step of obtaining the IP address assignment information stored in the DHCP server apparatus when remaining capacity of a storage portion becomes a certain level or less; and a step of determining whether or not each client apparatus is invalid based on the obtained IP address assignment information, and deleting the printing data of the client apparatus which is determined to be invalid from the storage portion.

\* \* \* \* \*